May 17, 1927.
F. J. SHOOK
1,629,178
CONNECTION FOR TORQUE ARMS OR THE LIKE
Filed Dec. 6, 1924
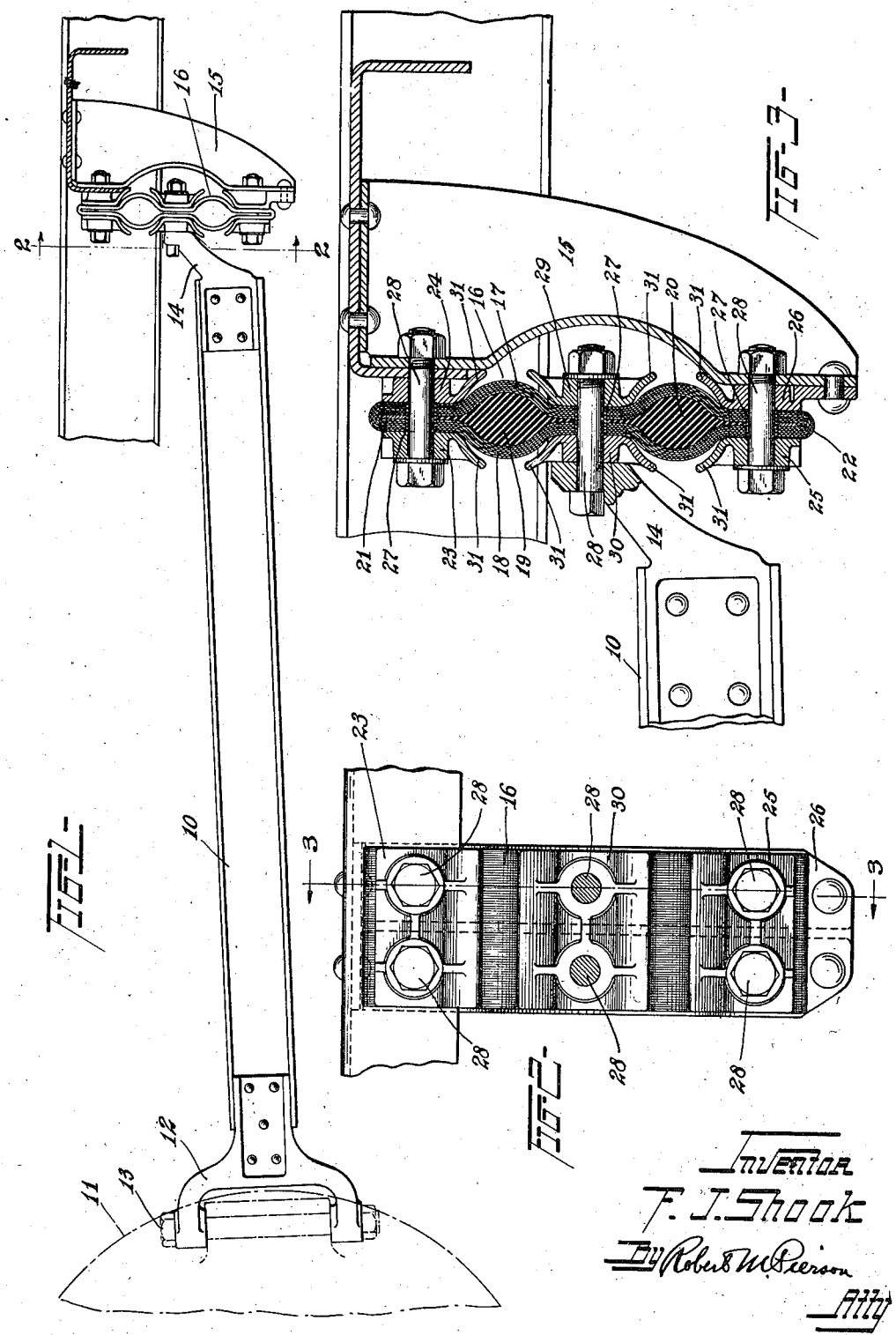

Patented May 17, 1927.

1,629,178

UNITED STATES PATENT OFFICE.

FLORAIN J. SHOOK, OF AKRON, OHIO, ASSIGNOR TO THE B. F. GOODRICH COMPANY, OF NEW YORK, N. Y., A CORPORATION OF NEW YORK.

CONNECTION FOR TORQUE ARMS OR THE LIKE.

Application filed December 6, 1924. Serial No. 754,388.

This invention relates to means for securing one mechanical part to another, and more particularly for securing to an automobile frame or the like the outer or body end of a torque arm such as is employed in many automobiles or trucks to hold the axle housing against the reaction of the driving torque.

My chief object is to provide an improved type of connection between two machine parts, such as the torque arm and the car frame of an automobile such that the torque arm, for example, will be strongly but resiliently held, without too great or too little amplitude or resilience. Further objects are to provide durability, freedom from noise, and cushioning of the arm against horizontal as well as vertical movement.

Of the accompanying drawings:

Fig. 1 is a side elevation of parts of an automobile embodying my invention in its preferred form, a part being sectioned.

Fig. 2 is a section on line 2—2 of Fig. 1.

Fig. 3 is a section on line 3—3 of Fig. 2.

Referring to the drawings, the torque arm 10 is attached to the axle-housing 11 by means of the usual vertical clevis 12 and clevis pin 13 in such manner that the torque arm is adapted to resist turning of the axle housing by the driving torque although pivoted upon the vertical axis represented by the clevis pin. At its front end the torque arm is provided with an extension bracket 14 which is connected with a bracket 15, projecting downward from the frame of the car to provide anchorage for the torque arm, by means of a flexible and resilient connecting member 16 having its upper and lower ends attached to the frame bracket 15 and its middle portion attached to the torque-arm bracket 14.

The said connecting member comprises opposite, flexible, facing layers 17, 18, preferably of rubberized fabric, clamped to the brackets at the respective attachment points, and embracing and held in double convex, bulged form, between the attachment points, by cushion bodies 19, 20 of resilient material. The said cushion bodies preferably are of soft rubber and secured to the rubberized fabric facings by vulcanization.

The fabric facings preferably consist of a winding of rubberized fabric, providing end loops passing about respective plate-like anchorage bars 21, 22 adapted to be gripped, within the respective end loops of fabric, and thus held in a vertical plane, by the attachment clamps 23, 24, or 25, 26 by which the ends of the connecting member are secured to the frame bracket 15, said bars also being adapted to bear against respective metal bushings or spacing sleeves 27, 27 mounted within the bolt holes of the connecting member 16, upon the clamping bolts 28, 28 which extend through the clamps, the connecting member and the frame bracket 15. The bushings 27 are adapted to abut the inner faces of the clamps to limit the setting up of the latter and thus avoid rupture of or damage to the fabric facings, while the bars 21, 22, bearing upon the bushings and sustaining the force of the end loops of fabric passing about them, are adapted to provide strong anchorage of the ends of the connecting member 16, but I do not claim the bushings and the anchorage bars as my invention.

A similar bushing 27 is mounted upon each of the clamping bolts 28 which secure the middle part of the connecting member 16 to the torque-arm bracket 14, and the clamps 29, 30 for the said middle portion, as well as the clamps 23, 24, 25, 26, are formed with cheek plates or flanges 31, 31, concavely curved about but normally diverging slightly from the zones of the connecting member 16 which are thickened or bulged by the presence of the cushion bodies 19, 20.

Each of the said thickened portions of the connecting member is adapted to be elongated and shortened as a whole by the force of the torque arm, without excessive elongation or compression of the fabric elements thereof, since the latter are adapted to yield merely by increase or decrease of their bulged condition, the interposed cushion bodies 19, 20 acting as resilient struts between the fabric facings as well as directly cushioning forces directed lengthwise of the connecting member 16. The latter is preferably of sufficient width transversely of the car, as shown, to provide a resilient but small-amplitude cushioning of the torque arm transversely of the car, and the cushion bodies provide such longitudinal elasticity of the connecting member that such fore and aft relative movement of the torque arm as takes place does not have so great a mechanical advantage as to unduly strain the fabric or the connecting member 16 as a whole.

The deformability of the cushion bodies 19, 20 permits the necessary flexure of the connecting member without excessive local flexure of the fabric, and the cheek plates or flanges 31 restrict the longitudinal compression of the thickened zones and thus cause the latter to act largely by compression and without destructive localized flexure of the fabric.

The torque arm is thus permitted a desirably limited, cushioned movement in all directions, without excessive strain upon the fabric elements and without noise or excessive wear, and a greatly improved torque arm connection is thus provided.

Details of construction may be modified without departure from the scope of my invention, and I do not wholly limit my claims to the exact construction shown.

I claim:

1. A torque arm connection comprising a torque arm, an anchorage therefor, and a connecting member operatively interposed between the two, said member having attachment points for the arm and anchorage respectively and comprising opposed facings of flexible material converging toward said attachment points and held bulged apart between said points by a cushion of resilient material.

2. A torque arm connection comprising a torque arm, an anchorage therefor, and a connecting member attached to said arm and anchorage and comprising opposed facings of rubberized fibrous material converging toward its attachment points and held bulged apart between said attachment points by a cushion body of rubber interposed between and vulcanized to said facings.

3. A torque arm connection comprising a torque arm, an anchorage therefor, and a connecting member having its ends attached to one of said arm and anchorage and its intermediate portion attached to the other so as to act simultaneously by compression and by tension, in respective zones thereof, in resisting the torque force of said arm, said member comprising opposed facings of flexible material approaching each other at the attachment zones and held bulged apart between said zones by cushion bodies of resilient material.

4. A torque arm connection comprising a torque arm, an anchorage therefor, and a connecting member having two attachment points to one of said elements and an interposed attachment point to the other so as to act simultaneously by compression and by tension, in respective zones thereof, in resisting the torque force of said arm, said member comprising relatively thin zones at the positions of attachment and relatively thick zones between said positions.

5. A torque arm connection comprising a torque arm, an anchorage therefor, and a connecting member having two attachment points to one of said elements and an interposed attachment point to the other so as to act simultaneously by compression and by tension, in respective zones thereof, in resisting the torque force of said arm, and said member comprising opposed facings of rubberized fibrous material approaching each other at the positions of attachment and held bulged apart between said positions by cushion bodies of resilient rubber interposed between and vulcanized to said facings.

6. A connecting member comprising opposed facings of fibrous material lying close together at three aligned positions to provide relatively thin attachment portions and a cushion body of rubber interposed between and vulcanized to said facings and holding them bulged apart between two of said attachment portions.

7. A connecting member comprising opposed facings of fibrous material converging at three spaced apart, aligned positions to provide relatively thin attachment portions and cushions of rubber interposed between and vulcanized to said facings and holding them bulged apart at positions alternating with said attachment portions.

8. A connection for two rigid members comprising a cushioning member interposed between the two, said cushioning member comprising a relatively thin portion attached to one of said rigid members, a relatively thick portion between said rigid members, united with said thin portion, and a pair of clamps embracing the thin portion of the cushioning member and clamping the latter to one of the rigid members, the said clamps being formed with respective flared, arcuate cheek-plates straddling the thick portion of the cushioning member to resist excessive deformation of the said thick portion under compression.

9. A connection for two rigid members comprising a cushioning member interposed between the two and having relatively thin portions attached thereto and a relatively thick, bulged, portion between the said thin portions, the surface of the cushioning member being reversely curved in contour from the thick portion to the thin portion, and an abutment member secured to one of said rigid members and presenting a reversely curved face to the cushion member in the vicinity of the junction of one of the latter's thin portions with its thick portion, so that the said face conforms roughly to the reversely curved contour of the cushion member and is adapted to limit distortion of the latter but stands away from the bulged portion of the cushioning member except when the said bulged portion is distorted.

In witness whereof I have hereunto set my hand this 3rd day of December, 1924.

FLORAIN J. SHOOK.